(12) United States Patent
Wulf et al.

(10) Patent No.: US 12,158,765 B2
(45) Date of Patent: Dec. 3, 2024

(54) SYSTEMS AND METHODS FOR MANAGING ASSIGNMENTS OF TASKS FOR MINING EQUIPMENT USING MACHINE LEARNING

(71) Applicant: Caterpillar Inc., Peoria, IL (US)

(72) Inventors: Stefan Jacob Wulf, Washington, IL (US); Cameron T Lane, Oro Valley, AZ (US); Andrew Seungyul Yun, Savoy, IL (US); Greg Davis, Wakerley (AU); Thomas Frank Doherty, Holland Park (AU); Darryl Collins, Jindale (AU)

(73) Assignee: Caterpillar Inc., Peoria, IL (US)

( * ) Notice: Subject to any disclaimer, the term of this patent is extended or adjusted under 35 U.S.C. 154(b) by 465 days.

(21) Appl. No.: 17/652,926

(22) Filed: Feb. 28, 2022

(65) Prior Publication Data

US 2023/0273624 A1 Aug. 31, 2023

(51) Int. Cl.
*G05D 1/02* (2020.01)
*G05B 13/02* (2006.01)
(Continued)

(52) U.S. Cl.
CPC ....... *G05D 1/0297* (2013.01); *G05B 13/0265* (2013.01); *G05D 1/0225* (2013.01);
(Continued)

(58) Field of Classification Search
CPC ............... G05D 1/0297; G05D 1/0225; G05D 2201/021; G05B 13/0265;
(Continued)

(56) References Cited

U.S. PATENT DOCUMENTS 9,026,349 B2    5/2015  Young et al.
10,732,639 B2   8/2020  Palanisamy et al.
(Continued)

FOREIGN PATENT DOCUMENTS

EP      3806007 A1      4/2021
JP      2013105278 A    5/2013
(Continued)

OTHER PUBLICATIONS

Written Opinion and International Search Report for Int'l. Patent Appln. No.PCT/US2023/061067, mailed May 23, 2023 (11 pgs).

*Primary Examiner* — Rodney A Butler

(57) ABSTRACT

Systems and methods are disclosed for managing task assignments for a fleet of haul trucks at a mine site. An assignment engine may: receive state data for a haul truck including haul weight data and second state data for the mine site that is indicative of a plurality of available tasks and associated task material weight data; assign a task to the haul truck by inputting the state data into a trained reinforcement-learning model, wherein: the model has been trained to learn an assignment policy that optimizes a reward function, such that the learned policy accounts for vehicle performance variance due to changing vehicle haul weight and/or road conditions; and cause the at least one haul truck to be operated according to the at least one task assignment.

20 Claims, 6 Drawing Sheets

(51) Int. Cl.
*G05D 1/00* (2006.01)
*G06Q 10/06* (2023.01)
*G06Q 10/0631* (2023.01)
*G07C 5/00* (2006.01)
*B60L 58/12* (2019.01)
*B60W 60/00* (2020.01)

(52) U.S. Cl.
CPC ....... *G06Q 10/06316* (2013.01); *G07C 5/008* (2013.01); *B60L 58/12* (2019.02); *B60W 60/00256* (2020.02); *B60W 2300/12* (2013.01); *B60W 2530/10* (2013.01); *B60W 2556/45* (2020.02); *B60W 2720/10* (2013.01)

(58) Field of Classification Search
CPC ......... G06Q 10/06316; G06Q 10/0631; G07C 5/008; B60L 58/12; B60W 60/00256; B60W 2300/12; B60W 2530/10; B60W 2556/45; B60W 2720/10

See application file for complete search history.

(56) References Cited

U.S. PATENT DOCUMENTS

| | | | |
|---|---|---|---|
| 10,764,911 | B2 | 9/2020 | Ramesh et al. |
| 10,839,473 | B2 | 11/2020 | Pedersen et al. |
| 2018/0247207 | A1 | 8/2018 | Ristovski et al. |
| 2019/0227569 | A1* | 7/2019 | Weslosky ............ G07C 5/0825 |
| 2019/0285425 | A1 | 9/2019 | Ludwick et al. |
| 2019/0310654 | A1 | 10/2019 | Halder |

FOREIGN PATENT DOCUMENTS

| | | |
|---|---|---|
| WO | 2016118122 A1 | 7/2016 |
| WO | 2019241307 A2 | 12/2019 |

* cited by examiner

SYSTEMS AND METHODS FOR MANAGING ASSIGNMENTS OF TASKS FOR MINING EQUIPMENT USING MACHINE LEARNING

TECHNICAL FIELD

This disclosure relates generally to managing assignment of tasks, e.g., of autonomous, semi-autonomous, or manually operated machines, for various operations such as material movement and/or mining. More particularly, this disclosure relates to systems and methods that incorporate machine-learning techniques to manage assignment of tasks to a fleet, e.g., a fleet of greenhouse-gas-free machines for operation of a mining site.

BACKGROUND

Certain applications, such as strip mining, involve the transportation of aggregate material, such as ore, from a mining site to a processing or shipping facility. Typical mining operations use guided haul trucks that carry the extracted material from an extraction area or material source to a deposition area or a material sink. A typical large-scale mining operation may include more than one material source and more than one material sink. The haul trucks used to transport the material may be autonomously guided, i.e., operate without a driver. A fleet of haul trucks servicing a mine site may perform hundreds of trips daily, as some mining operations operate around the clock. The loading of the aggregate material onto the haul trucks is typically accomplished by use of wheeled loaders or excavators, material conveyors, shovels, and the like. Detailed plans are put in place to manage these activities, ensuring that operators are moving the right amount of material to the right place at the right time. Efficient assignment of personnel and machines to various tasks may be a complex problem that may be very computationally intensive.

For many large commercial mining operations, maximization of equipment utilization is desired to maximize profit. The maximization of equipment utilization, especially in the case of autonomously guided vehicles, requires efficient dispatching of the haul trucks to the various loading and unloading stations. Various methods have been proposed in the past to optimize haul truck dispatching. For example, manual dispatch may be used to direct the haul trucks to the most efficient task at any given time. As can be appreciated, however, manual dispatch may not be as efficient as an automated task that performs the same function.

Another type of dispatch is a so-called "restricted" automatic dispatch, in which haul trucks are dispatched automatically based on restrictions defined by controllers of the mining site. Such controllers may include rules or limitations on haul truck assignments such as limiting a specific truck to a specific loading tool or dump site. Caterpillar's MineStar™ system is one example of an automatic dispatch system. One version of this system includes a multi-phase optimization of haul truck dispatch that periodically produces a production plan, based on a user's production target at a mine. The system dispatches haul trucks in near real time based on the defined production plan. In some implementations of this multi-phase optimization, the production plan includes information only on Loaded Production Arcs, which is a term used to describe a segment travelled by a loaded truck from a loading tool to a processor or material dump. When a haul truck is loaded at a loading site, its next assignment is constrained by the Loaded Production Arcs included in the production plan. When the haul truck dumps its payload at the material dump, it is automatically assigned to the neediest loading site, that is, to the loading tool that is more immediately ready to carry out a loading operation, a loading tool having a higher priority than other loading tools, and the like. Commonly owned U.S. 2021/0334720 A1, incorporated herein by reference in its entirety, discloses a further implementation of a real-time dispatcher.

While such restricted automatic dispatch can be used effectively at larger mine sites, such solutions may require that mine site controllers are vigilant and continuously manage the restrictions to optimize production. Thus, a more or fully automatic dispatch may be beneficial, e.g., so that mine operations may be optimized without the need for continuous intervention by controllers applying rules to the dispatch. Further, technologies for vehicles and mining operations are generally moving toward more environmentally-conscious technologies. However, such technologies, for example greenhouse-gas (GHG) free machines, may present constraints and challenges that may also not be accounted for in conventional solutions. For example, GHG free machines generally have limited energy storage on board that may limit the cycles that a machine can complete. GHG free machines generally require more frequent and strategic stoppages to recharge or refuel relative to conventional vehicles.

U.S. Patent Publication No. 2019/0285425 A1 to Waymo LLC is directed to systems and methods for managing a fleet of vehicles for public transportation. A server system may be configured as a dispatch system to determine a next vehicle task for a vehicle in the fleet based on vehicle data, charger data, and demand data. The vehicle tasks may include, but may not limited to, recharging, continuing to recharge, stopping recharging, powering off, or servicing a next trip. The vehicle data may include various types of information about a vehicle in the fleet. The vehicle may be autonomous, semi-autonomous, or driven by a human driver. The vehicle may be an electric vehicle, a hybrid vehicle, a gasoline vehicle, a fuel cell vehicle, etc. Tasks for vehicles may be determined using various machine-learning techniques, such as a reinforcement-learned simulation optimized for overall efficiency of the fleet. The model may be built using data from past trips as training data to solve optimization functions that aims to, for example, minimize empty miles driven by the fleet, minimize wait times of users, and minimize energy costs. However, such systems and methods may not account for unique challenges and complexities that may be present in mining operations.

The techniques of this disclosure may solve one or more of the problems set forth above and/or other problems in the art. The scope of the current disclosure, however, is defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one aspect, a computer-implemented method for managing task assignments for a fleet of haul trucks at a mine site may include: receiving, via one or more processors of an assignment engine system, first state data that includes state information for at least one haul truck of a fleet used to operate the mine site, the state information for the at least one haul truck including haul weight data; receiving via the one or more processors of the assignment engine system, second state data that includes state information for the mine site, wherein the state information for the mine site is indicative of a plurality of tasks available in the mine site and task material weight data associated with the plurality of tasks; assigning, via the one or more processors of the assignment engine system, at least one task from amongst the plurality of tasks to the at least one haul truck of the fleet by inputting the first state data and the second state data into a trained reinforcement-learning model, wherein: the trained reinforcement-learning model has been trained, based on training first state data and training second state data, to learn an assignment policy that optimizes a reward function for the mine site, such that the trained reinforcement-learning model is configured to apply the learned assignment policy to the input first state data and second state data to select the at least one task; and the training first state data includes training haul truck haul weight data, and the training second state data includes training task material weight data, such that the learned policy accounts for haul truck performance variance due to changing haul truck haul weight; and causing, via the one or more processors of the assignment engine system, the at least one haul truck to be operated according to the at least one task assignment.

In another aspect, a computer-implemented method for training a machine-learning model for managing task assignments for a fleet of haul trucks at a mine site may include: obtaining, via one or more processors of an assignment engine system, first training state data that includes state information for at least one haul truck of a fleet used to operate a mine site, the state information for the at least one haul truck including haul weight data; obtaining via the one or more processors of the assignment engine system, second training state data that includes state information for the mine site, wherein the state information for the mine site is indicative of a plurality of tasks available in the mine site and task material weight data associated with the plurality of tasks; assigning, via the one or more processors of the assignment engine system, at least one task from amongst the plurality of tasks to the at least one haul truck of the fleet by inputting the first training state data and the second training state data into a reinforcement-learning model that includes a task assignment policy and a reward function; causing, via the one or more processors of the assignment engine system, the at least one haul truck to be operated according to the at least one task assignment; obtaining further first training state data and further second training state data from a period of time after the at least one task assignment is complete; generating a score using the reward function based on the further first training state data and the further second training state; updating the task assignment policy based on the generated score.

In a further aspect, a system for operating a mine site may include: a fleet of haul trucks that are green-house-gas free and autonomous; a central controller, including: at least one memory storing instructions; and at least one processor operatively connected to the at least one memory. The processor may be configured to execute the instructions to implement: a production planner configured to determine at least one task assignment available for the fleet at the mine site and task material weight data for the at least one task; and a dispatcher configured to assign the at least one task assignment to at least one haul truck of the fleet. The dispatcher may have: a trained reinforcement-learning model that has been trained, based on training first state data that includes state information for the fleet and training second state data that includes state information for the mine site, to learn an assignment policy that optimizes a reward function for the mine site, such that the trained reinforcement-learning model is configured to apply the learned assignment policy to input first state data for the fleet and second state data for the mine site to select at least one task to assign to the fleet, wherein the training first state data includes training haul truck haul weight data and the training second state data includes training task material weight data, such that the learned policy accounts for haul truck performance variance due to changing haul truck haul weight; and an assignment engine. The assignment engine may be configured to perform operations, including: receiving the first state data including haul weight data for at least one haul truck in the fleet; receiving the second state data; assigning the at least one task to the at least one haul truck by inputting the first state data and the second state data into the trained reinforcement-learning model: and causing the at least one haul truck to be operated according to the at least one task assignment.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Figure 1:
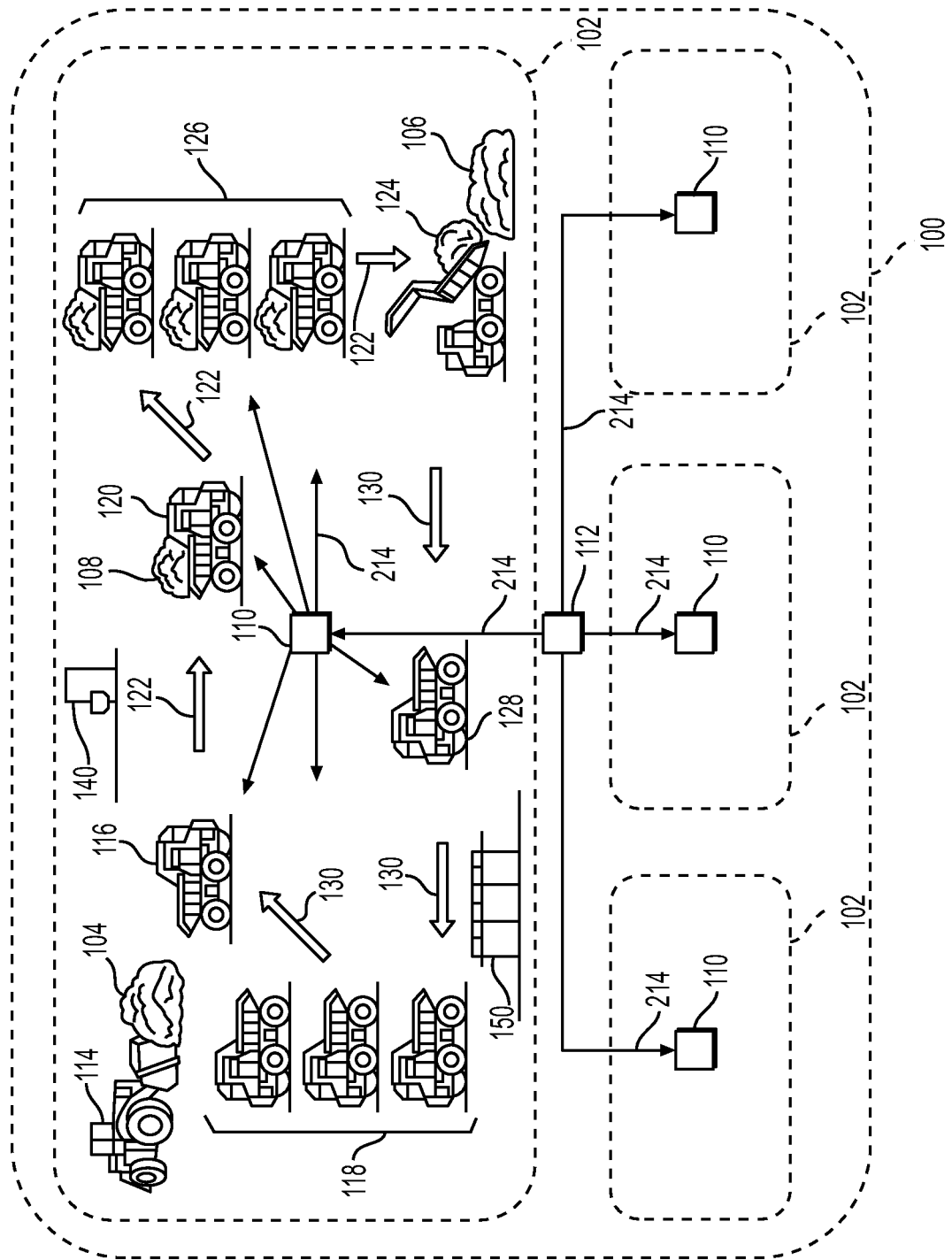
FIG. 1 depicts an exemplary schematic for a mine site operated by a fleet of GHG free haul trucks.

According to certain aspects of the disclosure, methods and systems are disclosed for assigning tasks to a fleet of vehicles, e.g., haul trucks of a mining site. The assets contemplated herein are transport assets used to transport material amongst one or more material production sites, one or more material consumption sites, one or more vehicle charging sites or devices, etc. An assignment engine utilizes machine-learning techniques to automatically dispatch haul trucks to carry mined aggregates between loader locations and dump locations, to return to loader locations, and to utilize charging stations or devices. The systems and methods may also dictate or specify the particular travel path from the dump locations to the loading locations that the haul trucks will use, whether and for how long haul trucks charge (e.g., at a static charging station or at a dynamic charging mechanism such as a trolley), and/or a speed at which the haul truck is to traverse the travel path. Systems and methods are described for using machine-learning, e.g., reinforcement-learning to train a policy executed by the assignment engine. By training the assignment engine, e.g., via reinforcement-learning, to learn associations between available task assignments and a current state of the fleet and the mining site, the trained assignment may be usable to optimize operation of the mining site for one or more goals such as total operating cost, energy consumption, material movement rate, etc.

A "reinforcement-learning model" is a type of machine-learning model that generally receives information about an environment as input, applies one or more weights and biases or the like to such input, and then applies the result therefrom to a policy usable to select a next action for the model. Generally, the policy of a reinforcement-learning model is trained using a reward function, e.g., an objective classification for cumulative benefit to the system. Results of the actions taken by the model are used with the reward function to determine the cumulative value of the actions, which may be fed back into the model to reinforce behaviors that had a positive effect on the cumulative benefit and/or de-emphasize behaviors that had a negative effect. In one example, environment information is, via a current version of the policy, associated with one or more actions. The actions are performed, resulting in a change to the environment, which may be scored with the reward function. The score is then used to adjust the association between the environment and the one or more actions. The amount that the association may be changed in each update may define how quickly the model learns. During training, various actions and environments may be enacted so as provide a wider variety of feedback for the model. In this manner, a reinforcement-learning model may be trained to take actions that not only may have an immediate benefit to the system, but also that have a long-term benefit. Further aspects of the use of such a model are discussed in further detail below.

In the description that follows, exemplary embodiments of autonomous haul trucks are used for sake of description, as this represents an application that can benefit from the advantages of the disclosed system and method, but it should be appreciated that the systems and methods described herein are applicable to any dispatch application used to control assets at a mine site, whether those assets are operated manually by humans or autonomously. It should be appreciated, however, that even manually operated assets can benefit from automated dispatch systems and methods as described herein. It should also be understood that the examples above are illustrative only. The techniques and technologies of this disclosure may be adapted to any suitable activity.

In an exemplary use case, an assignment engine is used to assign one or more next tasks to at least one haul truck in a fleet used to operate a mine site, e.g., according to a material movement plan for the mine site. An assigned task is generally associated with an arc, e.g., a particular route to a destination or destination type. An arc may be, for example, a production arc, a return arc, a charge arc, maintenance arc, etc. Production arcs generally indicate haul truck travel segments, in which the haul truck travels from a source location, where the haul truck is loaded with material, to a destination location, where the haul truck dispatches the previously loaded material. Return arcs represent haul truck travel segments, in which, e.g., after dispatching the material at the destination location, the empty haul truck travels from the destination location to a next source location. The source location that follows a destination location need not necessarily be the same source location from which the haul truck came from. A charge arc generally indicates charging segments, in which the haul truck travels from a current location (empty or full) to a static charging station for charging or refueling, and/or travels along a route that includes a dynamic charging device that enables charging during travel. A maintenance arc generally indicates a maintenance segment, in which the haul truck travels to a maintenance lot for maintenance. An arc may be assigned, based on a policy of the assignment engine, in any order or arrangement. Further, along with an arc, as assigned task may include other information such as whether the haul truck should utilize dynamic charging or refueling during travel (e.g., by using a trolley or electrified rail), and/or a particular speed at which the route should be travelled. As discussed in further detail below, by accounting for and including such information, the assignment engine may reduce queuing time of haul trucks in the mine site, enable opportunistic charging, reduce energy consumption of the mine site, reduce haul truck idle time or time spent at a static charging station, increase material movement efficiency, and/or decrease total operating cost of the mine site.

In another exemplary use case, a reinforcement-learning model may be trained to generate a policy for the assignment engine. Training state information for a fleet of haul trucks, as well as training state information for a mine site may be fed to a reinforcement-learning model in order to develop a policy that optimizes a reward function of the model. The training state information for the fleet includes data describing characteristics of haul trucks in the fleet such as, for example, one or more of state of charge, weight of material being hauled, location, speed, or characteristics of the vehicles themselves such as age, time since last maintenance, performance data, efficiency data, or the like. The training state information for the mine site may include one or more of data indicative of tasks available at the mine site, state or occupancy information for one or more of a static charging station, a dynamic charging device, a source or loading site, a sink or dumping site, a crusher, or any other equipment or device associated with the mine site, or information regarding available roads, road conditions, weather conditions, power availability or limitations, etc. for the mine site. In some instances, the state information for the mine site may include or be based on a production plan and/or a material movement plan for the mine site. In some instances, the training state information may include and/or be based on one or more simulations or models. For example, one or more models of a haul truck may be used to simulate the state information of the fleet prior to operations and/or as the fleet is used to execute one or more simulated tasks. In an example, a model or simulation of a haul truck may be used to determine a modeled or simulated characteristic such as how long the haul truck may operate at different speeds or with different amounts of hauled material based on state information such as state of charge or material haul amount. In some embodiments, at least a portion of the operation of the mine site may be simulated, e.g., based on one or more of the material movement plan, a simulation model of the mine site or the one or more models of the haul truck. However, in some embodiments, at least a portion of the training data may be sourced from actual haul truck(s) and/or mine site(s).

The reward function may be configured to optimize for one or more objectives such as for example, reducing total operating cost, reducing power consumption, balancing haul truck use and/or battery lifespan, increasing material movement rate, decreasing haul truck idle time and/or queuing, reducing unoccupied loading or dumping sites, improving or maintaining quality of material produced, ensuring a particular type, quantity, and/or grade of material is processed and/or transported to a particular destination, etc. As actions are performed (e.g., by the simulated and/or real haul trucks), outcomes of such actions may be ascribed scores based on the reward function. Feedback from such scores may be used to adjust the policy of the reinforcement-learning model, e.g., using any suitable machine-learning technique. The performance of actions and the adjustment of the policy may be iterated. For example, the policy may be adjusted after every action, after a set number of actions, after a set period of time, or based on any other suitable metric. Such iteration may be continued for a predetermined number of iterations, until the score reaches a predetermined threshold, until the score appears to reach a steady state or has a rate of change below a further predetermined threshold, for a predetermined period of time, until the scores achieve a steady state, or any other suitable criterion or combination thereof. In some embodiments, the iteration may continue until the score reaches an optimum or optimized value, as determined by any suitable criteria. A learned policy may be used, e.g., by an assignment engine, to select next assignments for haul trucks in a fleet operating a mine site. In some embodiments, further state data from the mine site may be used to one or more of update or tune a model for one or more of the haul trucks, tune or update a model for the mine site, or tune, update, or continue to train the reinforcement-learning model.

A schematic view of a mine site 100 in accordance with the disclosure is shown in FIG. 1. The mine site 100 may include one or more production circuits 102, which may include one or more production sites 104, one or more dump sites 106, and one or more haul trucks 108, e.g., travelling between or in operation at various locations in the mine site 100 such as the production sites 104 and dump sites 106. It should be appreciated that, depending on the material being produced, each circuit 102 may exclusively include its respective production sites 104 and dump sites 106. Alternatively, one production site 104 and/or one dump site 106 may be part of more than one circuit 102, for example, when material from one production site 104 is used at more than one dump sites 106 or, similarly, when the production at a dump site 106 requires material from more than one production site 104.

One or more of the haul trucks 108 may be a Greenhouse Gas (GHG) free vehicle, e.g., an electric vehicle or a vehicle with an onboard electrical power generation and/or storage device. Each haul truck 108 may include one or more sensors or devices (not shown) that are usable to determine or track various characteristics descriptive of a current state for the haul truck 108. Such characteristics may include, for example, one or more of location, speed, weight of material being hauled, type of material being hauled, grade of material being hauled, destination for the material being hauled (e.g., a next processing step such as a crusher, a storage location, or a destination such as a customer or job site), operating temperature, state-of-charge for the power storage device, state-of health for the power storage device, temperature for the power storage device, rate of charge or discharge for the power storage device, tire pressure, incline angle, operational time, vehicle age, etc. As will be discussed in further detail below, one or more of such characteristics and/or other state information from the mine site 100 may be used to determine, model, or simulate further characteristics of the haul truck 108.

The mine site 100 may further include one or more charging stations or devices, such as one or more static charging stations 140 or one or more dynamic charging devices 150. The static charging stations 140 and/or dynamic charging devices 150 may be configured to engage with and charge one or more haul trucks 108, and may be associated with a particular production circuit 102, may be associated with multiple production circuits 102, and/or may not be particular to any specific production circuits 102. In some embodiments, a static charging station 140 and/or a dynamic charging station 150 may be configured to charge and/or power other equipment on the mine site 100, e.g., a loader, a crusher, a road grader, a people carrier, or any other suitable machine or vehicle. A static charging station 140 may be co-located with other equipment on the mine site, e.g., to facilitate charging while a haul truck 108 is utilizing such equipment and/or to facilitate powering or charging such equipment.

A static charging station 140 may include one or more charging connections (not shown), e.g., a charging plug or the like, configured to charge the energy storage device of a haul truck 108 when the haul truck 108 is parked at and engaged with the charging connection. A static charging station 140 may be co-located with another mine site such as a production site 104 so that the haul truck 108 may be at least partially charged while visiting the production site 104, or the like. The charging station 140 may include one or more sensors (not shown) configured to track and/or determine one or more of occupancy or availability of the charging connections, power available for charging, power discharge rate, total power discharged, etc.

The dynamic charging device 150 may include, for example, a trolley device, electrified rail, or the like that is positioned along at least a portion of a route within the mine site 100, and may be configured to propel and/or at least partially charge one or more haul trucks 108 as they travel along the portion of the route. As will be discussed in further detail below, engaging with a dynamic charging device 150 may modify the performance of a haul truck 108, e.g., reduce a maximum travel speed to, for example, increase a charging rate or increase the maximum travel speed to reduce travel time, or the like. Modifying the travel speed, such as in the foregoing illustrative examples, may, e.g., via the reward function, facilitate optimization of available power, charge needed for a haul truck 108 to perform an assignment, production goals for material at the mine site 100, or the like. The dynamic charging device 150 may include one or more sensors (not shown) configured to track and/or determine one or more of occupancy or availability of the dynamic charging device 150, power available for charging, power discharge rate, etc.

Each circuit 102 may include a dedicated controller 110 that can monitor, control and/or relay information to or from assets such as the plurality of haul trucks 108, and other machines that may be operating within each particular circuit 102. The mine site 100 may include a central controller 112 that may communicate with the various circuit controllers 110 to relay and exchange high-level information that pertains to the mine site 100 as a whole. However, other arrangements and architectures are also contemplated.

The mine site 100 may include power generation means (not shown), e.g., a solar power plant or the like, or may include a power grid connection. The central controller 112 may monitor and/or regulate an amount of power fed to the mine site 100. For example, the central controller 112 may be configured to establish a maximum amount of power fed to the mine site 100 per day, a maximum rate of power supplied to the mine site 100, or the like. Such maximums may be based on availability, pre-existing agreements, e.g., with a power generation entity, costs for the supplied power, etc. As discussed in further detail the foregoing may also be used as input when optimizing operations of the haul trucks 108.

A production site 104 may be operated by one or more loaders 114. During operation, one or more haul trucks 108 may arrive at the production site 104 for loading, for example at a position 116. A production queue 118 may stack incoming haul trucks 108. A loaded haul truck 120 may travel a production arc 122 between the loading position 116 and a dump position 124 at the dump site 106. Loaded haul trucks may similarly be stacked at a dump queue 126 while waiting to assume the dump position 124. Emptied haul trucks 128 may travel a return arc 130 between the dump position 124 and the production queue 118 or the loading position 116 before repeating the production arc 122. It should be understood that tasking a haul truck 108 to a static charging station 140 and/or a dynamic charging device 150, e.g., a charging arc, may be integrated before, into, or after a production arc 122 or return arc 130, e.g., instead of stacking the haul truck 108 in a queue. In particular, a haul truck 108 may utilize a dynamic charging device 150 while travelling if instructed to do so, if the dynamic charging device 150 is available. This process, or a variant thereof, may be carried out in each of the circuits 102 during operation.

The rate of material transfer from the production site 104 to the dump site 106 can be generally quantified and compared to a target production rate defined within a production plan or material movement plan for the circuit 102. This production rate, from an asset engagement perspective, occupies a plurality of haul trucks 108 that are assigned to, or engaged in, the particular circuit 102 during operation.

As can be appreciated, in any given circuit, longer wait times of haul trucks in queues 118 and 126 can slow down the scheduled deliveries thereby reducing the overall production rate for that particular circuit. Further, it may be beneficial to optimize operation of the mine site 100 to one or more different objectives, such as minimizing total cost, total power consumption, rate of material movement, or compliance with a production plan or material movement plan. In general, a material movement plan for the mine site defines the amount of material moved from one or more locations in the mine site to one or more other locations in the mine site, which material movement can be expressed as a total tonnage of material over a period of time that is moved, or alternatively a rate of transfer of material in tons per hour, and the like. To address the foregoing at least in part, the haul truck assignments to or within a circuit may be modified.

As illustrated in FIG. 1, the mine site 100, e.g., the central controller 112, may include a production planner 202, e.g., to determine and/or define tasks available at the mine site 100, and a dispatcher 212, e.g., to assign various haul trucks 108 to the available tasks such as to a particular arc or operation. However, any suitable arrangement or architecture may be used, e.g., such an arrangement in which the production planner 202 and dispatcher 212 are integrated into a single component.

The production planner 202 may be configured to receive as an input a production plan or material movement plan 204. The production plan 204 may be manually or automatically input into the production planner 202 and can include information on the desired or target production for the mine site 100, e.g., on a daily basis, production goals for the mid- or long-term operation, production types and timing of product delivery for the mine site 100, scheduling, and other information relating directly to the desired type, amount and timing of mine output or production. This information may be input by a user by defining various system parameters included in a software application that is operating within the production planner 202, or may alternatively be provided automatically, for example, by processing customer orders for material that are submitted by customers, for example, over an internet-based ordering system. Regardless of the type or method of input of this information, the production plan 204 is provided to the production planner 202 and serves as a basis for all or most subsequent operations in the dispatch system 200.

In addition to the production plan 204, the production planner 202 may further receive as an input mine state information 206, which may be provided manually by a mine operator or can be extracted automatically by the production planner 202. The mine state information 206 includes one or more of information indicative of the number and operational state of haul trucks 108 that are available for work at any one time, the number, capacity and operational state of loading tools, processors, materials and mining blocks that are active, the type of material blocks that are active, the location of material blocks, the status of charging devices, a power availability and/or costs for the mine site 100, weather conditions, fuel and/or power costs, maintenance and cost rates, or the like. The mine state information 206 may include, for example, information regarding power drawn by and/or available to other equipment in the mine site. For example, in an arrangement where a static charging station 140 is also used to charge and/or power other equipment, the operational state of the other equipment may affect the power available by the static charging station 140 to charge a haul truck 108.

In general, the mine state information 206 provides information indicative of all useable resources and components available at any given time at the mine site 100 for production, transportation and processing of one or more products produced or placed at the mine site 100. Based on such input, the production planner 202 may determine available tasks, e.g., production arc information 208, return arc information 210, charging instructions, maintenance instructions, etc. Any suitable technique for determining available tasks may be used, e.g., manual, semi-autonomous, or autonomous determinations such as the techniques described in the above-referenced U.S. 2021/0334720 A1.

In an arrangement in which at least a portion of the haul trucks 108 are GHG free vehicles such as electric vehicles, the mine state information 206 may further include information indicative of an amount of charge need to perform various operations. For example, the state information may include information indicative of an amount of charge needed to travel along a particular route, a rate of charge drained per distance travelled, a change in charge drain rate due to amount of material being hauled or an incline or condition of a road, an amount of charge per time from charging at a static charging station 140 or via a dynamic charging device 150. Such information may be at least partially determined based on other information. For example, a rate of discharge per distance travelled for a haul truck 108 and a distance of a particular arc may be used to predict an amount of charge needed for the arc. Such information may be nominal information that may tuned to an individual haul truck 108, e.g., via a model or simulation, as discussed in further detail below. Such information may further include additional information about the mine site 100, such as locations of various sites and operations, distances for routes there-between, road inclinations, hours of operation, times and/or frequency of shift changes, schedules for down-time (e.g., for blasting, inspections, or the like), etc. At least a portion of the aforementioned information may be included in the material movement plan or production plan 204. At least a portion may be determined based on data received from one or more sensors or devices on the mine site 100 or external data such as satellite imagery or site plans or the like. At least a portion may be entered manually. At least a portion may be determined and/or tuned based on a model or simulation of the mine site 100, as discussed in further detail below.

As can be appreciated, optimization of mine resource utilization can vary greatly based on the various haul truck assignments that are made to achieve a target production rate via the various production arcs 208 and return arcs 210 and other tasks. Other optimization goals that may be implemented instead of or in addition to the target production rate may include, for example, a total operating cost, an amount of power used, a lifetime of the haul trucks 108, a utilization of site down time for vehicle charging, a rate of opportunistic charging, etc. Optimization goals may be preset and/or may be tuned or selected manually.

This optimization task may be carried out by the dispatcher 212, which may receive the task information from the production planner 202. The dispatcher 212 may process the task information, and send dispatch commands, e.g., task assignments 214 to each mining asset, including specifically the various haul trucks 108. The task assignments 214 are specific commands for each truck 108 in each circuit 102 to perform a specific task. A task assignment 214 to a haul truck 108 may include, for example, a destination, a route to the destination, a speed for travel (e.g., for the trip or for various stages of the trip), a charging requirement, a dynamic charging device usage plan, an intersection priority, etc. A dynamic charging device usage plan may include, for example, an instruction or request for travel speed, charging, travel time, or the like, for a haul truck 108 with regard to a dynamic charging device 150. An intersection priority may define which haul truck 108 has priority when the travel path of multiple haul trucks 108 overlap, and may define or facilitate one or more of modifying travel speed, pausing travel of a haul truck 108, redirecting a haul truck 108 (e.g., to a static charging station 140), or the like, e.g., to reduce or remove the overlap. Pre-determining such an intersection priority may also reduce computational time and/or load experienced in the event of such an overlap. The likelihood of an overlap may also be used as a factor for the reward function, e.g., so that assignments are made that are less likely to result in overlaps. Intersection priority may be at least partially based on characteristics of the haul trucks 108 with a potential overlap, e.g., one or more of type or grade of material being hauled, whether the destination for the haul truck(s) is occupied or is available, etc. Intersection priority may be determined via the dispatcher 212, e.g., as part of an assignment for a particular haul truck 108.

Each of the haul trucks 108 may be operated by a human operator, or may be at least partially self-driven. While the haul trucks 108 perform the various tasks, information is provided back to the dispatcher 212, e.g., via sensors and/or devices of the haul truck 108 and/or of the mine site 100, that indicates task progress, truck position, diagnostics and/or other information, such that subsequent tasks can be assigned to a haul trucks 108 when a previous task is completed.

Tasks may be assigned to haul trucks 108 that are mid-task. For example, a rate of discharge for a haul truck 108 may exceed a predicted rate, such that the haul truck 108 may be in danger of failing to complete the task. Detection of such deviance may cause the dispatcher to re-task the haul truck, e.g., assign the haul truck a new or superseding task causing the haul truck to receive charging.

As noted above, the dispatcher 212 may be operating within the central controller 112, and may be configured to disseminate information between the central controller 112 and the various circuit controllers 110, which in turn relay information to/from the various assets including the haul trucks 108. The dispatcher 212, like the production planner 202, may be implemented in the form of computer executable instructions in non-transitory computer media includes an algorithm that use various computational or algorithmic methods to process the target production and return arcs into particular assignments for the haul trucks. As such, the dispatcher 212 may be implemented in the form of computer hardware and/or software that includes memory devices, user input and output instrumentalities, a processor, database, wired and/or wireless communication devices and other structures that are configured to receive, process and send information to/from the production planner dispatcher 212 and various other external systems including systems operating and/or controlling operation of the haul trucks 108.

During operation, the dispatcher 212 operates using various methods including statistical methods and AI models to minimize the time spent by haul trucks 108 executing non-production return arcs 130. To achieve this result, it is often the case that a haul truck 108 may not return to the same loading location from which it was loaded on production arc that was just completed, but rather be re-routed to a different production location, possibly within a different circuit 102, that is either closer, has a higher priority, or is expected to be ready to load sooner than other loading locations. To determine the optimal next task assignment 214 for a haul truck 108, the dispatcher 212 may employ an assignment engine that utilizes one or more machine-learning techniques, as discussed in further detail below.

Figure 2:
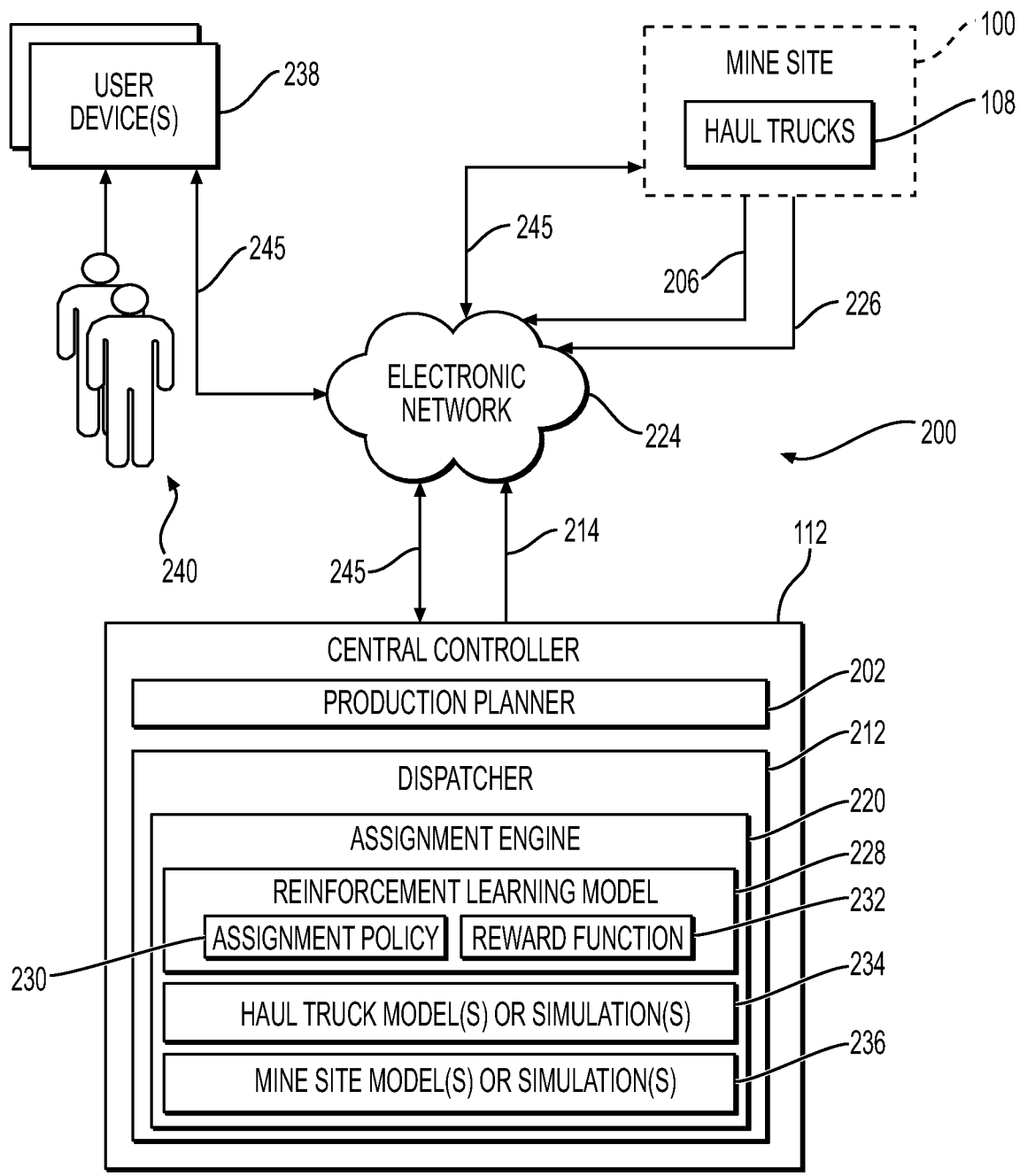
FIG. 2 depicts a dispatcher of a central controller of the mine site of FIG. 1.

FIG. 2 depicts an exemplary embodiment of the dispatcher 212 from FIG. 1 that includes an assignment engine 220 that may employ one or more machine-learning techniques, e.g., to determine task assignments 214 as discussed in further detail below. As shown in FIG. 2, the dispatcher 212 may be operating within the central controller 112, which may relay task assignments 214 from the assignment engine 220 to various devices of the mine site 100 including the haul trucks 108, e.g., via an electronic network 224. Although illustrative examples of assignments for haul trucks 108 are included below, it should be understood that the dispatcher 212, may be configured to generate task assignments 214 for any suitable equipment on the mine site, e.g., loaders, crushers, road graders, clean-up dozers, people carriers, etc. For example, task assignments for the mine site 100 may include instructions for other equipment to be charged and/or powered, such as equipment configured to be charged and/or powered by a static charging station 140 or dynamic charging station 150 other than a haul truck 108.

Further, the assignment engine 220 may be configured to receive, via the central controller 112, mine site state information 206, haul truck state information 226, and/or other data. The assignment engine 220 may include, for example, a reinforcement-learning model 228 that includes an assignment policy 230 and a reward function 232. The assignment engine 220 may further include one or more further models or simulations, e.g., at least one haul truck model or simulation 234 or at least one mine site model or simulation 236. The dispatcher 212, assignment engine 220, central controller 112, and/or other devices (not shown) may be accessible via or in communication with one or more user device(s) 238, e.g., via the electronic network 224 in the form of communications 245. The one or more user device(s) 238 may be associated with a user 240, e.g., a mine site controller and/or a user associated with one or more of generating, training, or tuning the reinforcement-learning model 228, the reward function 232, and/or one or more of the simulations or models 234 or 236.

While an illustrative arrangement is depicted in FIGS. 1 and 2, systems and devices of the mine site 100 may communicate in any arrangement. As will be discussed herein, systems and/or devices of the mine site 100 may communicate in order to one or more of generate, train, or use a machine-learning model to optimize task assignments 214 for the mine site 100, among other activities.

The user device 238 may be configured to enable the user 240 to access and/or interact with other systems in the mine site 100. For example, the user device 238 may be a computer system such as, for example, a desktop computer, a mobile device, a tablet, etc. The user device 238 may include one or more electronic application(s), e.g., a program, plugin, browser extension, etc., installed on a memory of the user device 238. The electronic application(s) may be associated with one or more of the other components in the mine site 100. For example, the electronic application(s) may include one or more of system control software, system monitoring software, software development tools, mine site planning software, simulation software, regulation or compliance software, etc. The user device 238 may enable the user 240 to manually generate or adjust information or setting for the mine site 100, e.g., for the production planner 202, the dispatcher 212, the assignment engine 220, and/or other equipment or devices for the mine site 100. In an illustrative example, the user device 238 may enable the user 240 to tune or adjust the reward function 232, e.g., to adjust the optimization objectives of the reinforcement-learning model 228. The user device 238 may be configured to generate output indicative of data associated with the mine site 100, e.g., positions or activities of the haul trucks 108, capacities or availabilities of equipment or devices, a material production rate, an operating cost rate, a power consumption rate, statistics such as average haul truck 108 idle time or queue time, etc. Such output may, for example, be generated or determined by the user device 238 and/or by the central controller 112, e.g., based on the mine site state information 206, and/or the haul truck state information 226.

The electronic network 224 may be a wide area network ("WAN"), a local area network ("LAN"), personal area network ("PAN"), or the like. Electronic network 224 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the assignment engine 220 may one or more of (i) generate, store, train, or use the reinforcement-learning model 228 configured to one or more of generate the assignment policy 230 or apply the assignment policy 230 to assign one or more tasks, e.g., to haul trucks 108 of the mine site 100. The assignment engine 220 may further include instructions associated with the reinforcement-learning model 228, e.g., instructions for generating reinforcement-learning model 228, training the reinforcement-learning model 228, using the reinforcement-learning model 228 etc.

The central controller 112 or the assignment engine 220 may include training data used or usable to train the reinforcement-learning model 228. A system or device other than the central controller 112 is used to generate and/or train the reinforcement-learning model 228. For example, such a system may include instructions for generating the reinforcement-learning model 228, the training data, and/or instructions for training the reinforcement-learning model 228. A resulting trained reinforcement-learning model 228 may then be provided to the assignment engine 220.

Generally, a machine-learning model includes a set of variables, e.g., nodes, neurons, filters, etc., that are tuned, e.g., weighted or biased, to different values via the application of training data. In reinforcement-learning, such as the learning used with the reinforcement-learning model 228, machine-learning techniques are used to train/generate a policy for taking various actions that have a cumulative positive effect as interpreted by a reward function. Generally, the model is configured to receive one or more inputs descriptive of an environment, e.g., the devices and/or haul trucks 108 of the mine site 100. The policy is then applied to the inputs. The policy may be in the form of one or more weights and biases applied to the input data. The policy may be initialized with random values for the weights and biases, and/or may be initialized with random relationships between various inputs. As least a portion of the initial policy may be manually generated or sourced from a pre-trained model, or the like. To train the model (e.g., develop or tune the policy), training input is provided, whereby the policy is used to determine next actions, e.g., task assignments 214 for the haul trucks 108 of the mine site. Once the task assignments 214 have been completed, the state of the mine site 100 environment, e.g., the mine site 100, may be re-evaluated against the reward function to determine an efficacy of the current state of the policy. Further, the outcome from the reward function may be fed back into the model, whereby a relatively higher score may be used to reinforce the weights, biases, or relationships that were used in the policy that resulted in better outcomes, and a relatively lower score may be used to de-emphasize portions of the policy resulting in worse outcomes. Thus, over the course of training, the policy generally trends toward increased satisfaction of the reward function.

Training may be conducted in any suitable manner, e.g., in batches, and may include any suitable training methodology. A portion of the training data may be withheld during training and/or used to validate the trained machine-learning model, e.g., to evaluate an efficacy of the trained policy. The training data for the reinforcement-learning model 228 may include historical state information from the mine site 100 and/or other mine sites. Training may be performed periodically, and/or continuously, e.g., in real-time or near real-time. For example, a stream of state information from the mine site 100 and/or from the haul trucks 108 may be used to refine and/or improve the reinforcement-learning model 228. Such a stream, and or real-time or near real-time refinement may facilitate adaptation of the reinforcement-learning model 228 to changing conditions such as, for example, weather conditions that may impact road condition, breakdown of a haul truck 108 or other mine site equipment, a schedule change, a production requirement change, a safety hazard, etc.

The training data may include simulated state data, e.g., resulting from a haul truck model or simulation 234 and/or a mine site model or simulation 236, as discussed in further detail below. Simulated state data may be used to train the reinforcement-learning model 228 in a first training phase, and actual state data from the mine site 100 and haul trucks 108 may be used to train the reinforcement-learning model 228 in a second training phase. Any suitable training schema or procedure may be used.

As noted above, the policy of a reinforcement-learning model may include any number of variables applied to the input. The variables of the policy may be interrelated in any suitable arrangement. In one example, the policy may be represented as a single node, whereby the input to the node is the input state data and the output of the node is indicative of a selected action. In a deep learning model, the policy may include multiple nodes, whereby one or more nodes may be the input for subsequent nodes instead of or in addition to the input. Any suitable deep learning architecture may be used.

For example, the architecture used by the reinforcement-learning model 228 may include a Recurrent Neural Network ("RNN"). Generally, RNNs are a class of feed-forward neural networks that may be well adapted to processing a sequence of inputs. The machine-learning model may include a Long Short Term Memory ("LSTM") model. An LSTM model may be configured to generate an output from a sample that takes at least some previous samples and/or outputs into account. Such architectures may enable or facilitate behavior of the policy that accounts for both short-term and long-term considerations with regard to the reward function.

The reward function 232 for the reinforcement-learning model 228 may be usable to determine an objective score after the completion of one or more assigned tasks using various factors based on data such as the mine site state information 206, and/or the haul truck state information 226 from a point in time after the tasks are complete. Data used to score the reward function may be one or more of obtained from one or more sensors or devices of the mine site 100, obtained from another system, entered manually, or the like. The factors for the reward function may include, for example, one or more of amount and/or rate of opportunistic charging and/or dynamic charging by the haul trucks 108, whether any of the haul trucks 108 ran out of charge, an occupancy rate of equipment or machines of the mine site 100, state-of-charge for the haul trucks 108, a balance of the state-of charge, state of health, and/or usage of the fleet of haul trucks 108, fuel and/or charging operating cost, total operating cost or cost rate, material movement amount or rate, material movement cost rate, quality of output material, whether the power used exceeded available power and/or emplaced limits on power use, whether charging was scheduled so as to minimize down-time, e.g., during site off hours or shift changes, etc. The reward function may include a factor related to temporal alignment of assigned tasks 214, e.g., with a shift schedule at the mine site 100, closures or down time for equipment or a circuit 102, or the like. One or more factors, such as one or more of the foregoing factors, may be expressed in common units, e.g., in terms of impact on operating cost of the mine sit 100, or the like. Thus, optimizing operation of the mine site 100 via the reward function may result in a reduction and/or optimization of operating cost for the mine site 100.

Any objective measure, such as may be determined manually and/or via a sensor or device of the mine site 100, may form at least a portion of a basis for a factor of the reward function. As noted above, the user 240 may adjust the reward function 232, such as via the user device 238, e.g., in order to select and/or prioritize factors for the reward function 232 corresponding to various optimization objectives for the mine site 100. Generally, the reinforcement-learning model 228 would be trained or at least partially re-trained after modification to the reward function 232.

As used herein, "opportunistic charging" generally encompasses any charging that may occur while a haul truck 108 may otherwise be idle, e.g., while queuing, stopped due to an operating schedule at the mine site 100, etc. or while static at a loading or dumping site. A haul truck 108 may also be dynamically charged in a manner that has a reduced impact on limiting progression of a task or operation of the mine site. In one example, a haul truck 108 may be dynamically charged while traveling along a route via a dynamic charging device 150. In a further example, a haul truck 108 may include a regenerative braking system configured to generate power via braking when the haul truck 108 is braking while descending an incline. A higher amount of opportunistic charging and/or dynamic charging generally corresponds to one or more of less idle time and/or more efficient operation for a haul truck 108.

As noted above, the assignment engine 220 may include one or more haul truck model or simulation 234. The haul truck model or simulation 234 may be usable, e.g., by the assignment engine 220, to generate training data for the reinforcement-learning model 228. Further, the haul truck model or simulation 234 may be usable, e.g., via the assignment engine 220, to determine one or more characteristics of the state of a haul truck 108. For example, some aspects of the state of a haul truck 108 may be observed or determined via a sensor, such as state of charge, position, current weight of hauled material, etc. Using the haul truck model or simulation 234, such characteristics may be used to predict other characteristics that may not be easily directly observed such as, for example, how much charge a particular task assignment 214 may use for the haul truck 108, a time for the particular task to be completed, an effect of the particular task on the operational life of the haul truck 108 or the power storage device thereof, whether the haul truck has sufficient charge to complete the particular task, etc. The haul truck model or simulation 234 and/or aspects of the state of the haul truck(s) 108 may be fed to the assignment engine 220 as further input to the reinforcement-learning model 228 and/or the assignment policy 230. Such characteristics, and in particular whether the haul truck 108 has sufficient charge to perform a task, may be used as initial constraints or conditions for one or more of the production planner 202, dispatcher 212, or assignment engine 220. Such characteristics may be compared with or modified by aspects of the mine site 100, e.g., aspects of the particular task. For example, a haul truck 108 having insufficient charge to complete a task may nevertheless be listed as available for that task if there is availability for sufficient opportunistic charging during the task for the task to be completed.

The assignment engine 220 may generate and/or store a separate model and/or information usable to generate a respective model for each haul truck 108 of the mine site 100. Aspects of the state of the haul truck(s) 108 may be tracked over time. Current state information for the haul trucks 108 may be compared with historical information, e.g., to determine a deviation from expected performance, which may be used to trigger a maintenance operation or the like. Although discussed above with regard to the assignment engine 220, the haul truck model or simulation 234 may operate in conjunction with and/or be stored on any suitable component, such as the central controller 112, the production planner 202, onboard a computing device of the haul truck itself, etc.

As also noted above, the assignment engine 220 may include one or more mine site model or simulation 236. The mine site model or simulation 236 may be usable, e.g., by the assignment engine 220, to generate training data for the reinforcement-learning model 228. Further, the mine site model or simulation 236 may be usable, e.g., via the assignment engine 220, to determine one or more characteristics of the state of the mine site 100. For example, some aspects of the state of the mine site 100 may be observed or determined via a sensor, such as power consumption rates, occupancy of a site or charging station or device, etc. Using the mine site model or simulation 236, such characteristics and/or the state information from the haul trucks 108 may be used to predict other characteristics that may not be easily directly observed such as, for example, efficiency rates for various machines or equipment, for the mine circuits 102, or for the mine site 100 as a whole, material movement amounts or rates, opportunistic charging rates, etc. The mine site model or simulation 236 and/or aspects of the state of the mine site 100 may be fed to the assignment engine 220 as further input to the reinforcement-learning model 228 and/or the assignment policy 230. Such characteristics, and in particular a power availability and occupancy for the one or more static charging stations 140 and/or dynamic charging device 150, may be used as initial constraints or conditions for one or more of the production planner 202, dispatcher 212, or assignment engine 220. Such characteristics may be compared with or modified by aspects of the haul trucks 108 or of the production planner 202, e.g., aspects of the available tasks.

The assignment engine 220 may generate and/or store a separate model and/or information usable to generate a respective model for each circuit 102 of the mine site 100. Aspects of the state of the mine site 100 may be tracked over time, e.g., to determine trends and/or make predictions about future performance. Current state information for the mine site 100 may be compared with historical information, e.g., to determine a deviation from expected performance, which may be used to trigger a maintenance operation or the like. Although discussed above with regard to the assignment engine 220, the mine site model or simulation 236 may operate in conjunction with and/or be stored on any suitable component, such as the central controller 112, the production planner 202, onboard a computing device of the haul truck itself, etc.

Any suitable type of models or simulations may be used for the haul truck model or simulation 234 or the mine site model or simulation 236. One or more of the haul truck model or simulation 234 or the mine site model or simulation 236 includes a machine-learning model, e.g., that may be trained based on historical operation of a haul truck 108 or mine site 100, and/or that may be tuned as additional state information becomes available.

Various components of the central controller 112 may operate at different timing rates. For example, the production planner 202 may be configured to determine available tasks for the mine site on a daily, hourly, or half-hour basis. The dispatcher 212 and/or assignment engine 220 may be configured to determine and/or modify task assignments 214 for the haul trucks 108 every half-hour, every ten minutes, every minute, or in real-time or near real-time. The assignment engine 220 may be configured to tune or retrain the reinforcement-learning model 228 on a daily basis, continuously, in real-time or near real-time, or the like. The assignment engine 220 may be configured to assign a plurality of tasks to a haul truck 108, e.g. a set of tasks to be completed one after the other. The assignment engine 220 may be configured to re-evaluate tasks assigned to the haul truck 108, e.g., as successive tasks are completed and/or other circumstances change in the mine site 100. The assignment engine 220 may assign tasks to the fleet of haul truck 108 that correspond to operation of the mine site 100 for a predetermined period of time, such as a shift, a day, a week, etc., and may modify or tune such assignments on a periodic, near real-time, or real-time basis. The haul truck model or simulation 234 or the mine site model or simulation 236 may be operated or tuned continuously, or on a periodic basis. It should be understood that the foregoing examples are illustrative only, and that any suitable timing for any of the foregoing elements may be used.

Although depicted as separate components in FIG. 2, it should be understood that a component or portion of a component in the central controller 112 may be integrated with or incorporated into one or more other components. Operations or aspects of one or more of the components discussed above may be distributed amongst one or more other components. Any suitable arrangement and/or integration of the various systems and devices of the central controller 112 may be used.

In general, any process or operation discussed in this disclosure that is understood to be computer-implementable, such as the processes discussed below, may be performed by one or more processors of a computer system, such as any of the systems or devices of FIG. 2, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 2. One or more processors of a computer system may be included in a single computing device or distributed among a plurality of computing devices. A memory of the computer system may include the respective memory of each computing device of the plurality of computing devices.

Figure 3:
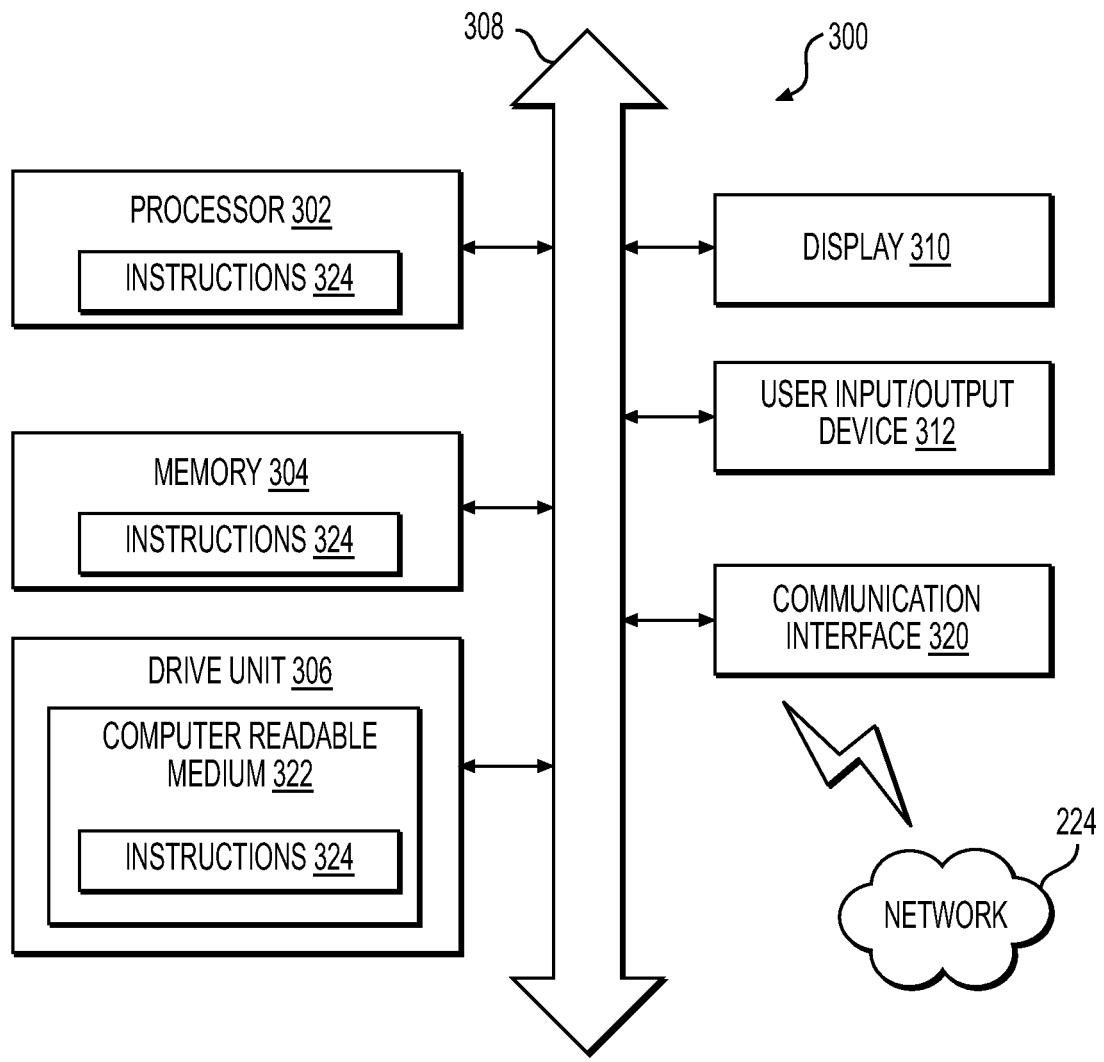
FIG. 3 depicts an example of a computing device.
Figure 4:
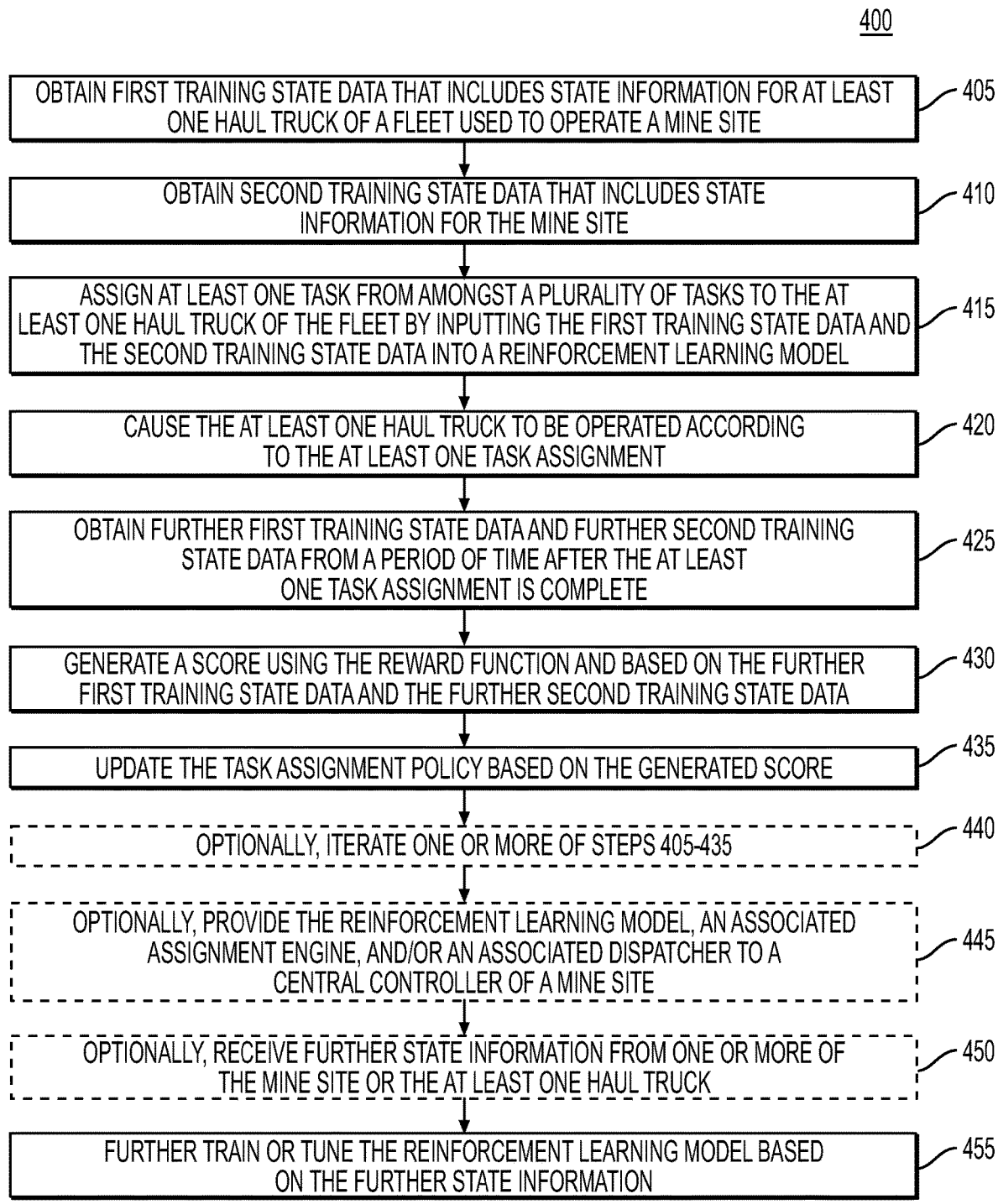
FIG. 4 depicts a flowchart of an exemplary method of training a reinforcement-learning model to manage task assignments for a fleet of haul trucks operating a mine site.
Figure 5:
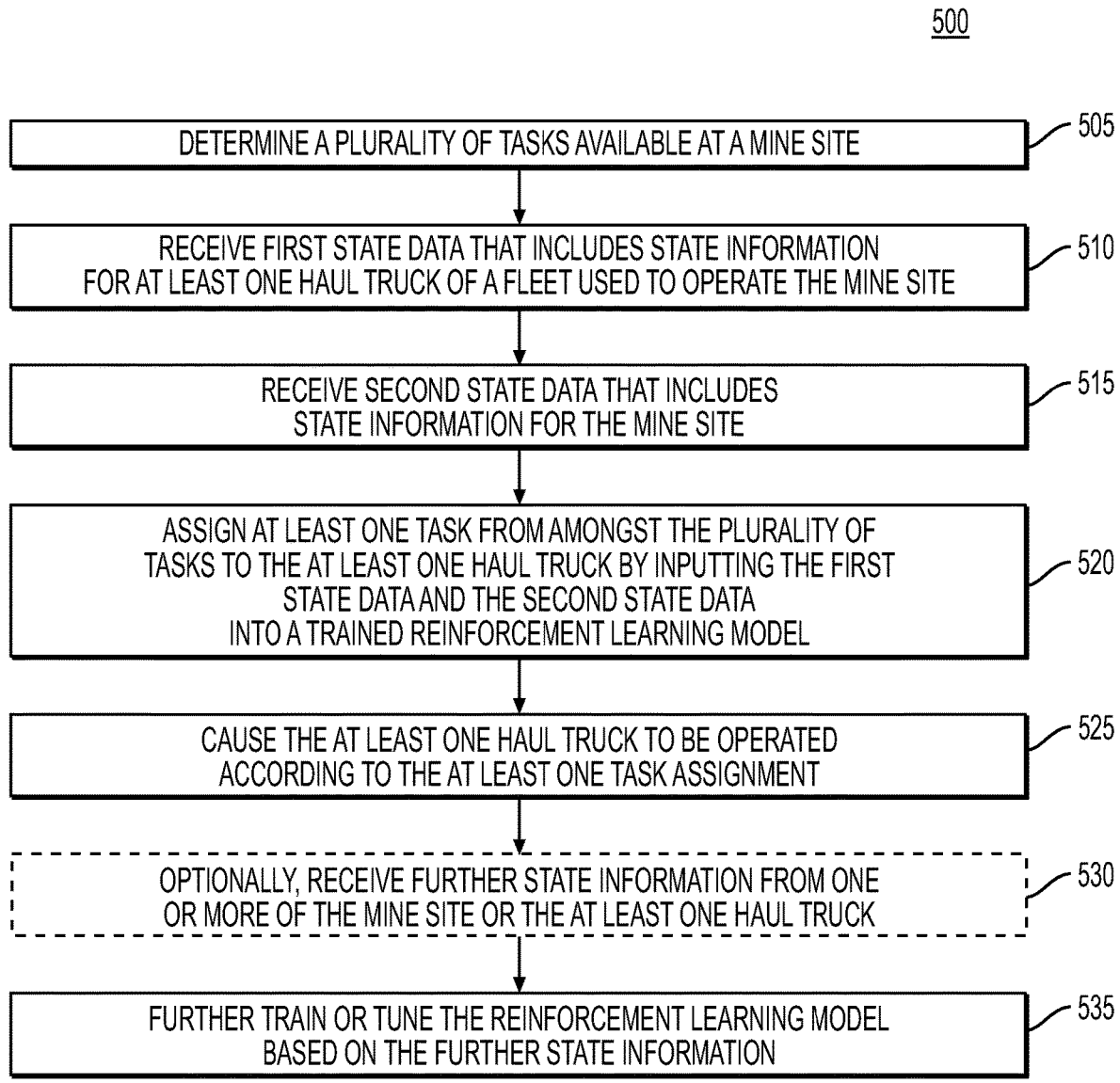
FIG. 5 depicts a flowchart of an exemplary method of using a trained reinforcement-learning model to manage task assignments for a fleet of haul trucks operating a mine site.
Figure 6:
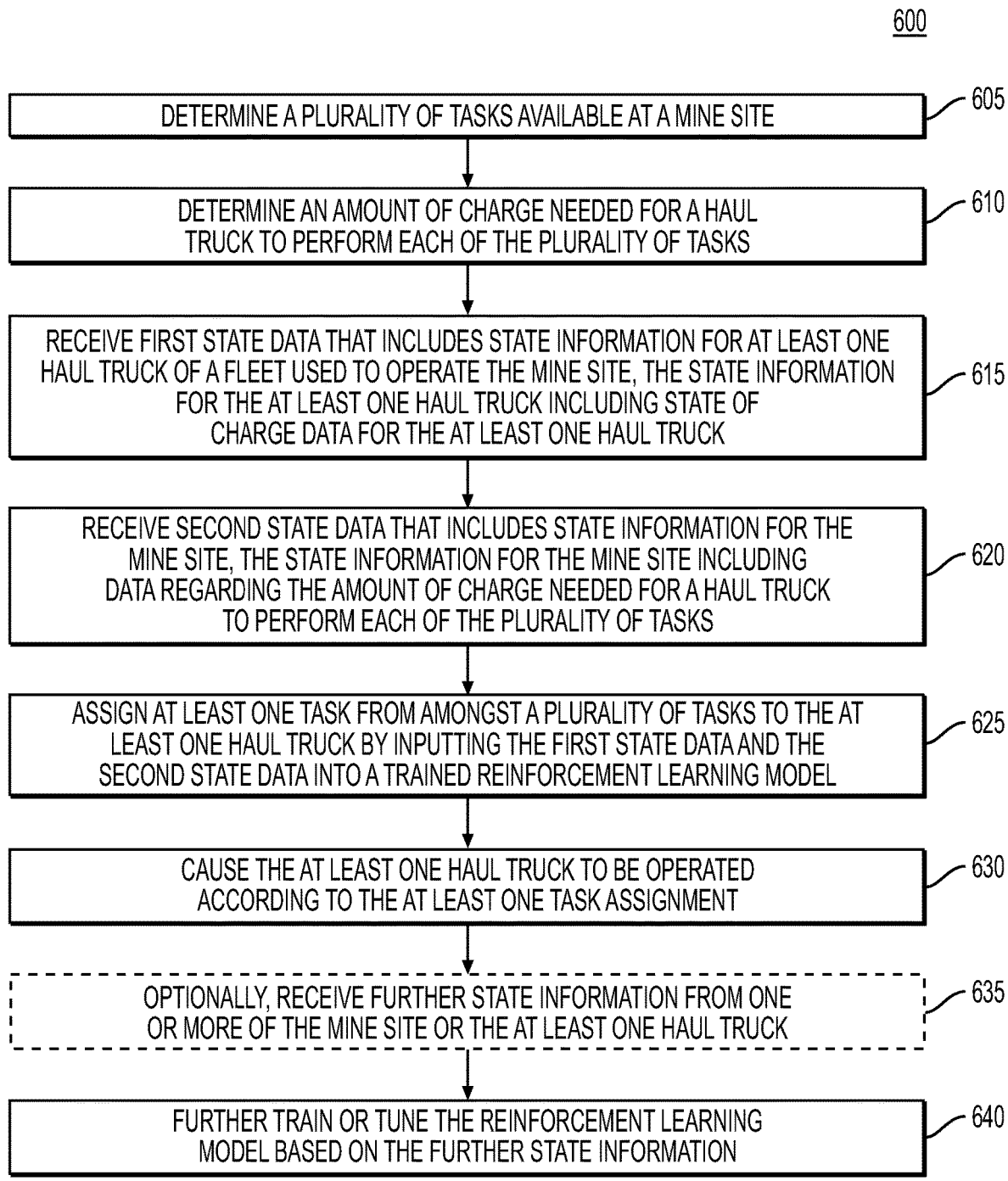
FIG. 6 depicts a flowchart of another exemplary method of using a trained reinforcement-learning model to manage task assignments for a fleet of haul trucks operating a mine site.

FIG. 3 is a simplified functional block diagram of a computer 300 that may be configured as a device for executing the methods of FIGS. 4-6, according to exemplary embodiments of the present disclosure. For example, the computer 300 may be configured as the central controller 112 and/or another system according this disclosure. Any of the systems herein may be a computer 300 including, for example, a data communication interface 320 for packet data communication. The computer 300 also may include a central processing unit ("CPU") 302, in the form of one or more processors, for executing program instructions. The computer 300 may include an internal communication bus 308, and a storage unit 306 (such as ROM, HDD, SDD, etc.) that may store data on a computer readable medium 322, although the computer 300 may receive programming and data via network communications. The computer 300 may also have a memory 304 (such as RAM) storing instructions 324 for executing techniques presented herein, although the instructions 324 may be stored temporarily or permanently within other modules of computer 300 (e.g., processor 302 and/or computer readable medium 322). The computer 300 also may include input and output ports 312 and/or a display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

INDUSTRIAL APPLICABILITY

An assignment engine 220, such as those described in one or more of the examples above, that is configured to optimize assignment of tasks to vehicles in a fleet, may be used in conjunction with any appropriate activity, e.g., to optimize assignment to fleet of haul trucks 108 for a mine site 100. An assignment engine 220, such as those described above, may be configured to optimize operations of a fleet of vehicles for various objectives, including one or more of total operating cost, total production or production rate, utilization or balance of charge amongst the fleet, balance or maintenance of the fleet, efficiency of the fleet, etc. Such an assignment engine 220 may be used in conjunction with a wide variety of components and devices, e.g., production and planning devices, machines or equipment that collectively operate on a job site for various activities such as construction, mining, farming, material sorting or transport, logistics, packing, etc.

In managing the assignment of tasks for a fleet of vehicles, e.g., a fleet of GHG free vehicles, for various operations, such as for operating a mine site 100, it may be desirable to optimize the operation for one or more objectives in an autonomous or semi-autonomous manner. It may be desirable to ensure that tasks are only assigned to haul trucks having sufficient operational capacity to complete such tasks. It may be desirable to facilitate opportunistic charging of the fleet, reduce vehicle idle time or time spent at stationary charging, balance usage and load across the fleet, regulate or reduce total power consumption or a power consumption rate of mine site 100 equipment (e.g., one or more of a particular haul truck 108, the fleet of haul trucks 108, haul trucks 108 assigned to a particular route, static charging stations 140, dynamic charging stations 150, other equipment for the mine site 100, and/or an overall energy draw for the mine site 100), or the like. It may be beneficial to account for historical performance when determining a predicted rate of discharge for a haul truck, or whether a haul truck has sufficient capacity to perform a task. It may be desirable to account for how conditions may affect vehicle performance, e.g., weight of material hauled or inclination or condition of roads on a rate of discharge per distance travelled. For example, a change in weather conditions may affect road conditions, vehicle or equipment performance, material quality, etc.

Further aspects of a reinforcement-learning model and/or how it may be utilized to manage a fleet of vehicles are discussed in further detail in the methods below. In the following methods, various acts may be described as performed or executed by a component from FIG. 1 or 2, such as the central controller 112, the assignment engine 220, the user device 238, or the like. However, it should be understood that any suitable component or device may execute instructions or perform acts including the acts discussed below. An act performed by a device may be considered to be performed by a processor, actuator, or the like associated with that device. Further, it should be understood that various steps may be added, omitted, and/or rearranged in any suitable manner. In an example, the computer system executing the assignment engine 220, be it the central controller 112 or another system such as a system for training the reinforcement-learning model 228, may be referred to interchangeably as a dispatch system 200 or as an assignment engine system 200.

FIG. 4 illustrates an exemplary process for training a reinforcement-learning model to optimize operation of a mine site, such as in the various examples discussed above. At step 405, an assignment engine 220 of an assignment engine system may obtain first training state data that includes state information for at least one haul truck 108 of a fleet used to operate a mine site 100. The assignment engine 220 may be of a dispatcher 212 operating on a central controller 112 for the mine site 100. The assignment engine 220 may be on another system, e.g., a user device 238, for training a reinforcement-learning model 228 of the assignment engine 220. The first training state information may include, for example, haul weight data for the at least one haul truck and/or other data associated with one or more of state-of-charge, location, speed, current assignment, operating time, historical usage information, or the like. At least a portion of the first training state data may be historical data associated with the fleet of haul trucks 108. At least a portion of the first training state data may be determined or generated using at least one simulation or model of at least one of the haul trucks 108. The assignment engine 220 may include a respective simulation or model for each haul truck 108. At least a portion of the fleet may be autonomous and/or GHG free vehicles.

At step 410, the assignment engine may obtain second training state data that includes state information for the mine site 100, which may be indicative of a plurality of tasks available in the mine site 100 and task material weight data associated with the plurality of tasks. The state information for the mine site 100 includes a material movement plan for the mine site 100 and state information for one or more of a static charging station 140, a dynamic charging device 150, a material source site, a material sink site, a material processing site, a weather condition associated with the mine site, a road condition or inclination associated with the mine site, or the like. At least a portion of the second training state data may be received from a production planner 202, e.g., configured to determined available tasks for the mine site 100 and/or other associated data. At least a portion of the second training data may be determined or generated using a simulation or model of the mine site 100. The assignment engine 220 may include a respective simulation or model for each circuit 102 in the mine site 100.

At step 415, the assignment engine 220 may assign at least one task from amongst the plurality of tasks to the at least one haul truck 108 of the fleet by inputting the first training state data and the second training state data into the reinforcement-learning model 228. The reinforcement-learning model may include a task assignment policy and a reward function. For example, the reinforcement-learning model may apply the policy to the input first and second training state data, causing at least one task to be assigned to the at least one haul truck 108. The policy may include a relational model or neural network, or the like. The assignment of the at least one task to the at least one haul truck 108 may include additional information such as, for example, route information, destination information, speed information, charging instructions, or the like for the at least one task assignment. An exemplary task assignment for a haul truck 108 may include, for example, travel to a particular location at a particular speed, travel to a particular location, utilize a dynamic charging device 150 while travelling, e.g., with a specified amount of power from the dynamic charging device 150 used to charge and/or propel the haul truck 108, travel to a static charging station 140 and charge for a predetermined period of time or until a state-of-charge for the haul truck reaches a particular level, or the like. Instructions regarding the speed for travel for a task assignment may result in efficient scheduling of tasks across the fleet. For example, speed instructions may result in reduced queuing, more efficient occupancy of a charging station 140 or charging device 150, reduced overlap in travel paths and/or interactions between haul trucks 108 at intersections, or steady utilization of a production or dump site.

At step 420, the assignment engine 220 may cause the at least one haul truck 108 to be operated according to the at least one task assignment. For example, the assignment engine may, e.g., via the central controller 112, transmit one or more instructions to the at least one haul truck 108 and/or a computing device associated with the haul truck 108. The at least one haul truck 108 may be autonomous, such that receiving the instructions causes the at least one haul truck 108 to execute the instructions in furtherance of the at least one task assignment. The at least one haul truck 108 may be operator-driven, such that the instructions are received at a computing device associated with an operator. Instructions received at a computing device associated with an operator may be received in conjunction with instructions for the haul truck 108 that include a speed plan to automatically set a speed of travel and/or limit a minimum or maximum travel speed of the haul truck, e.g., to facilitate operation of the haul truck 108 as directed by the dispatcher 212.

At step 425, the assignment engine 220 may obtain further first training state data and further second training state data from a period of time after the at least one task assignment is complete. The assignment engine 220 may obtain state information after each respective task is completed. The assignment engine 220 may obtain state information after a batch of tasks, e.g., the plurality of tasks in the second training state information, are complete. The assignment engine 220 obtains state information as it is available, continuously, and/or in real time or near real time.

At step 430, the assignment engine 220 may generate a score using the reward function and based on the further first training state data and the further second training state. The reward function may include a rubric of criteria, a weighted scoring function, or the like. Various criteria or objectives for the reward function may be interrelated, e.g., via one or more sub-functions. The reward function may include an algorithm or the like based on one or more objective. The reward function may be predetermined. At least a portion of the reward function may be entered or selected manually, e.g., by a user 240 via a user device 238. The reward function may account for at least one of total cost for operating the mine site, total material processed by the mine site, power consumption of the mine site, balance of charge across the fleet, state of charge of the fleet, capacity for the at least one haul truck to complete the at least one task assignment, or the like.

At step 435, the assignment engine 220 may update the task assignment policy based on the generated score. For example, the assignment engine 220 may use one or more machine-learning techniques to feed the score back into the task assignment policy, e.g., such that portions of the policy resulting in a higher score are reinforced, or such that portion of the policy resulting in a lower score are de-emphasized.

Optionally, at step 440, one or more of steps 405-435 may be iterated, e.g., to further adjust the task assignment policy. The method may be iterated until one or more of: the score at least meets a predetermined threshold; a predetermined number of iterations have occurred; or a predetermined period of time has passed. Any criterion for iterating the method for tuning of the task assignment policy may be used.

Optionally, at step 445, one or more of the policy, the reinforcement-learning model 228, the assignment engine 220, or the dispatcher 212 may be provided to or utilized by the central controller 112 of the mine site 100 in order to manage the assignment of tasks to the fleet of haul trucks 108.

Optionally, at step 450, the assignment engine 220 may receive further state information, e.g., from the mine site 100 and/or the haul trucks 108.

Optionally, at step 455, the assignment engine 220 may further train or tune the reinforcement-learning model based on the further state information.

FIG. 5 illustrates an exemplary process for managing task assignments for a fleet of haul trucks 108 for a mine site 100, e.g., by utilizing a trained reinforcement-learning model such as a reinforcement-learning model 228 trained according to one or more examples discussed above. At least a portion of the fleet of haul trucks 108 may be one or more of autonomous or GHG free vehicles. At step 505, a production planner 202, e.g., operating on a central controller 112 of a mine site 100, may determine a plurality of tasks available at the mine site 100. Such determination may be based on, for example, a material movement plan or a production plan, and/or state data that includes state information descriptive of a state of the mine site 100 and/or a simulation of the mine site 100, e.g., that may be predictive of a future state of the mine site 100. The production planner 202 may determine available tasks periodically, e.g., daily, hourly, or the like, or may determine available tasks in response to a trigger or request, e.g., from a user 240 via a user device 238.

From time to time, a dispatcher 212, e.g., operating on an assignment engine system such as the central controller 112, may use a reinforcement-learning model to assign at least one of the plurality of available tasks to at least one haul truck 108 of the mine site. For example, at step 510, an assignment engine 220, e.g., of the dispatcher 212, may receive first state data that includes state information for at least one haul truck 108 of a fleet used to operate the mine site 100. The state information for the at least one haul truck 108 may include haul weight data, e.g., data descriptive of a current weight of material being hauled by the haul truck 108. The haul weight data may be obtained from one or more of a sensor onboard the haul truck, a production site that sourced the material, a weigh station of the mine site 100, or the like. As noted above, and especially when the haul truck 108 is a GHG free vehicle, the weight of material being hauled may have a significant effect on the operation of the haul truck 108, e.g., in terms of rate of discharge when travelling, maximum speed, etc. Accounting for such information may facilitate optimization of the utilization of the haul truck 108. The first state data may include a respective learning model for each haul truck 108 in the fleet that, for example, may be updated based on operating characteristics of the respective haul truck 108 over time.

At step 515, the assignment engine 220 may receive second state data that includes state information for the mine site. The state information for the mine site 100 may be indicative of a plurality of tasks available in the mining site, e.g., as determined by the production planner, and task material weight data associated with the plurality of tasks. In other words, the state information of the mine site 100 may facilitate accounting for how performance of the haul truck 108 may vary due to, for example, receiving material to haul or dumping material. The state information of the mine site 100 may also account for other factors that may affect the performance of the haul truck 108 such as, for example, one or more of inclination or condition of roads used to service a task, the occupancy or availability of a static charging station 140 or dynamic charging station 150 that may be usable by the haul truck 108 before, during, and/or after performing the task. Other factors, such as weather or power availability, a schedule at the mine site 100, or the like may also be accounted for. The state information for the mine site 100 may include a material movement plan for the mine site.

At step 520, the assignment engine 220 may assign at least one task from amongst the plurality of tasks to the at least one haul truck 108 by inputting the first state data and the second state data into a trained reinforcement-learning model 228. The trained reinforcement-learning model 228 may have been trained by one or more of the techniques discussed above, e.g., the method of FIG. 4. For example, the trained reinforcement-learning model may have been trained, based on training first state data and training second state data, to learn an assignment policy that optimizes a reward function for the mine site, such that the trained reinforcement-learning model is configured to apply the learned assignment policy to the input first state data and second state data to select the at least one task. The training first state data may include training vehicle haul weight data, and the training second state data may include training task material weight data, such that the learned policy accounts for vehicle performance variance due to changing vehicle haul weight. The assignment of the at least one task may include route instructions and speed instructions. The reward function of the reinforcement-learning model 228 may account for at least one of total cost for operating the mine site, total material processed by the mine site, power consumption of the mine site, balance of charge across the fleet, state of charge of the fleet, or capacity for the at least one haul truck to complete the at least one task assignment. Any objective measure associated with the mine site 100 may be accounted for in the reward function.

At step 525, the assignment engine 220 may cause the at least one haul truck 108 to be operated according to the at least one task assignment.

Optionally, at step 530, the assignment engine 220 may receive further state information, e.g., from the mine site 100 and/or the haul trucks 108.

Optionally, at step 535, the assignment engine 220 may further train or tune the reinforcement-learning model based on the further state information.

FIG. 6 illustrates an exemplary process for managing task assignments for a fleet of haul trucks 108 for a mine site 100, e.g., by utilizing a trained reinforcement-learning model such as a reinforcement-learning model 228 trained according to one or more examples discussed above. At least a portion of the fleet of haul trucks 108 may be one or more of autonomous or GHG free vehicles. At step 605, a production planner 202, e.g., operating on a central controller 112 of a mine site 100, may determine a plurality of tasks available at the mine site 100. Such determination may be based on, for example, a material movement plan or a production plan, and/or state data that includes state information descriptive of a state of the mine site 100. The production planner 202 may determine available tasks periodically, e.g., daily, hourly, or the like, or may determine available tasks in response to a trigger or request, e.g., from a user 240 via a user device 238.

At step 610, the production planner 202 may determine an amount of charge needed for a haul truck 108 to perform each of the plurality of tasks at the mine site 100. The determined amounts of charge for the plurality of tasks may be nominal amounts, e.g., based on the charge needs or performance of a nominal haul truck 108. Such determined amounts of charge may be determined based on, for example, one or more of a distance traveled for a particular task, an inclination or condition of a road or roads to be traveled for the particular task, a weight associated with material to be hauled for the particular task, etc.

From time to time, a dispatcher 212, e.g., operating on an assignment engine system such as the central controller 112, may use a reinforcement-learning model to assign at least one of the plurality of available tasks to at least one haul truck 108 of the mine site. For example, at step 615, an assignment engine 220, e.g., of the dispatcher 212, may receive first state data that includes state information for at least one haul truck 108 of a fleet used to operate the mine site 100. The state information for the at least one haul truck 108 may include state of charge data, e.g., descriptive of a state of charge for the at least one haul truck 108, an amount of time or distance over which the at least one haul truck 108 has a capacity to operate, a state-of health for the at least one haul truck 108 or a component thereof, a fuel status or fuel capacity (e.g., for a GHG free fuel such as hydrogen or the like), a maintenance status or maintenance history, a current location, a current velocity, a current destination, and/or any other suitable information regarding the at least one haul truck 108. The capacity to operate may be a nominal amount based on the state of charge that, for example, may be tuned or adjusted based on an inclination or condition of a road used to travel, a weight of material being hauled, an availability or utilization of opportunistic charging, etc.

The state information for the at least one haul truck 108 may further include haul weight data, e.g., data descriptive of a current weight of material being hauled by the haul truck 108. The haul weight data may be obtained from one or more of a sensor onboard the haul truck, a production site that sourced the material, a weigh station of the mine site 100, or the like. As noted above, the weight of material being hauled may have a significant effect on the operation of the haul truck 108, e.g., in terms of rate of discharge when travelling, maximum speed, etc. Accounting for such information may facilitate optimization of the utilization of the haul truck 108.

The first state data may include a respective learning model for each haul truck 108 in the fleet that, for example, may be updated based on operating characteristics of the respective haul truck 108 over time. For example, the respective learning model for the at least one haul truck 108 may be usable to estimate, predict, or determine the capacity for operation of the at least one haul truck 108, e.g., based on the state of charge data, historical performance data for the at least one haul truck 108, and/or aspects of a task assignment for which the at least one haul truck 108 is considered, as discussed in further detail below.

At step 620, the assignment engine 220 may receive second state data that includes state information for the mine site. The state information for the mine site 100 may be indicative of the plurality of tasks available in the mining site, e.g., as determined by the production planner, and the charge needed and/or task material weight data associated with the plurality of tasks. For example, the state information of the mine site may include the data regarding the amount of charge needed to perform the plurality of tasks. In other words, the state information of the mine site 100 may facilitate accounting for the capacity of each haul truck 108 to operate and/or how performance of the haul truck 108 may vary due to, for example, receiving material to haul or dumping material. The state information of the mine site 100 may also account for other factors that may affect the performance of the haul truck 108 such as, for example, one or more of inclination or condition of roads used to service a task, the occupancy or availability of a static charging station 140 or dynamic charging station 150 that may be usable by the haul truck 108 before, during, and/or after performing the task. Other factors, such as weather or power availability, a schedule at the mine site 100, or the like may also be accounted for. The state information for the mine site 100 may include a material movement plan for the mine site.

At step 625, the assignment engine 220 may assign at least one task from amongst the plurality of tasks to the at least one haul truck 108 by inputting the first state data and the second state data into a trained reinforcement-learning model 228. The trained reinforcement-learning model 228 may have been trained by one or more of the techniques discussed above, e.g., the method of FIG. 4. For example, the trained reinforcement-learning model may have been trained, based on training first state data and training second state data, to learn an assignment policy that optimizes a reward function for the mine site, such that the trained reinforcement-learning model is configured to apply the learned assignment policy to the input first state data and second state data to select the at least one task. The training first state data may include training state of charge data, and the training second state data may include training task data and training charge data regarding amounts of charge needed to perform tasks in the training task data, such that the learned policy accounts for the capacity of a haul truck to complete an assigned task. The assignment of the at least one task may include route instructions and speed instructions. In an example, route instructions may include instructions to use opportunistic and/or dynamic charging during performance of the assigned task.

Assigning the at least one task to the at least one haul truck 108 may include evaluating the capacity of the at least one haul truck 108 to complete the at least one task. For example, the state of charge of the at least one haul truck 108 may be compared with an amount of charge needed to perform the at least one task. One or more of the respective learning model for the at least one haul truck 108 or a model or simulation of the mine site 100 may be used to determine whether the capacity of the at least one haul truck 108 is sufficient to complete the at least one task. For example, the respective model for a haul truck 108 may be usable to determine that the rate of discharge for that haul truck 108 is greater than a nominal discharge rate of a nominal haul truck. The capacity of that haul truck 108 may be decreased relative to a nominal amount, e.g., due to component lifetime, road or weather conditions, or the like, and if the decreased capacity is insufficient to complete the at least one task, the at least one task may not be assigned to that haul truck 108. In another example, opportunistic charging available during performance of the at least one task may increase the capacity of the haul truck 108.

The reward function of the reinforcement-learning model 228 may account for at least one of total cost for operating the mine site, total material processed by the mine site, power consumption of the mine site, balance of charge across the fleet, state of charge of the fleet, an amount of opportunistic charging utilized during performance of the task assignments, an amount of stationary charging used, e.g., via a stationary charging station 140, or capacity for the at least one haul truck to complete the at least one task assignment. Any objective measure associated with the mine site 100 may be accounted for in the reward function.

At step 630, the assignment engine 220 may cause the at least one haul truck 108 to be operated according to the at least one task assignment.

Optionally, at step 635, the assignment engine 220 may receive further state information, e.g., from the mine site 100 and/or the haul trucks 108.

Optionally, at step 640, the assignment engine 220 may further train or tune the reinforcement-learning model based on the further state information.

It should be understood that embodiments in this disclosure are exemplary only, and that other embodiments may include various combinations of features from other embodiments, as well as additional or fewer features. For example, while some of the embodiments above pertain to GHG free vehicles, any suitable vehicle or machine that may be assigned tasks may be used. Further, while some of the embodiments above pertain to material movement for a mine site, any suitable activity may be used such as, for example, construction, excavation, or the like. In addition, while some of the embodiments above pertain to haul trucks, any suitable vehicle and/or stationary machine may be used such as, for example, road graders, bulldozers, loaders, etc.

What is claimed is:

1. A computer-implemented method for managing task assignments for a fleet of haul trucks at a mine site, comprising:

receiving, via one or more processors of an assignment engine system, first state data that includes state information for at least one haul truck of a fleet used to operate the mine site, the state information for the at least one haul truck including haul weight data;

receiving via the one or more processors of the assignment engine system, second state data that includes state information for the mine site, wherein the state information for the mine site is indicative of a plurality of tasks available in the mine site and task material weight data associated with the plurality of tasks;

assigning, via the one or more processors of the assignment engine system, at least one task from amongst the plurality of tasks to the at least one haul truck of the fleet by inputting the first state data and the second state data into a trained reinforcement-learning model, wherein:

the trained reinforcement-learning model has been trained, based on training first state data and training second state data, to learn an assignment policy that optimizes a reward function for the mine site, such that the trained reinforcement-learning model is configured to apply the learned assignment policy to the input first state data and second state data to select the at least one task; and the training first state data includes training haul truck haul weight data, and the training second state data includes training task material weight data, such that the learned policy accounts for haul truck performance variance due to changing haul truck haul weight; and causing, via the one or more processors of the assignment engine system, the at least one haul truck to be operated according to the at least one task assignment.

2. The computer-implemented method of claim 1, wherein the state information for the mine site includes a material movement plan for the mine site and state information for one or more of a static charging station, a dynamic charging mechanism, a material source site, a material sink site, a material processing site, a weather condition associated with the mine site, or a road condition associated with the mine site.

3. The computer-implemented method of claim 1, wherein the first state data includes a respective learning model for each haul truck in the fleet that is updated based on operating characteristics of the respective haul truck over time.

4. The computer-implemented method of claim 1, wherein the at least one task assignment includes route instructions and speed instructions.

5. The computer-implemented method of claim 1, wherein:

the at least one haul truck is a green-house-gas free vehicle;

the state information for the at least one haul truck further includes a state of charge for the at least one haul truck; and the training first state data further includes training haul truck state of charge data, and the training second state data includes training task charge requirement data, such that the learned policy accounts for capacity for the at least one haul truck to complete the at least one task assignment.

6. The computer-implemented method of claim 1, the at least one haul truck is an autonomous vehicle.

7. The computer-implemented method of claim 1, wherein the reward function accounts for at least one of total cost for operating the mine site, total material processed by the mine site, power consumption of the mine site, balance of charge across the fleet, state of charge of the fleet, an amount of opportunistic charging for the fleet, or capacity for the at least one haul truck to complete the at least one task assignment.

8. A computer-implemented method for training a machine-learning model for managing task assignments for a fleet of haul trucks at a mine site, comprising:

obtaining, via one or more processors of an assignment engine system, first training state data that includes state information for at least one haul truck of a fleet used to operate a mine site, the state information for the at least one haul truck including haul weight data;

obtaining via the one or more processors of the assignment engine system, second training state data that includes state information for the mine site, wherein the state information for the mine site is indicative of a plurality of tasks available in the mine site and task material weight data associated with the plurality of tasks;

assigning, via the one or more processors of the assignment engine system, at least one task from amongst the plurality of tasks to the at least one haul truck of the fleet by inputting the first training state data and the second training state data into a reinforcement-learning model that includes a task assignment policy and a reward function;

causing, via the one or more processors of the assignment engine system, the at least one haul truck to be operated according to the at least one task assignment;

obtaining further first training state data and further second training state data from a period of time after the at least one task assignment is complete;

generating a score using the reward function based on the further first training state data and the further second training state;

updating the task assignment policy based on the generated score.

9. The computer-implemented method of claim 8, wherein the method is iterated until one or more of:

the score at least meets a predetermined threshold;

a rate of change of the score across iterations is less than a further predetermined threshold;

a predetermined number of iterations have occurred; or a predetermined period of time has passed.

10. The computer-implemented method of claim 8, further comprising:

receiving, from a user via a user device, one or more objective selections; and generating or tuning the reward function based on the one or more objective selections.

11. The computer-implemented method of claim 8, wherein at least a portion of the fleet is simulated, such that at least a portion of the first training state data is simulated information.

12. The computer-implemented method of claim 8, wherein at least a portion of the mine site is simulated, such that at least a portion of the second training state data is simulated information.

13. The computer-implemented method of claim 8, wherein the state information for the mine site includes a material movement plan for the mine site and state information for one or more of a static charging station, a dynamic charging mechanism, a material source site, a material sink site, a material processing site, a weather condition associated with the mine site, or a road condition associated with the mine site.

14. The computer-implemented method of claim 8, wherein the at least one task assignment includes route instructions and speed instructions.

15. The computer-implemented method of claim 1, wherein:

the at least one haul truck is a green-house-gas free vehicle; and the at least one haul truck is an autonomous vehicle.

16. The computer-implemented method of claim 8, wherein the reward function is configured to account for at least one of total cost for operating the mine site, total material processed by the mine site, power consumption of the mine site, balance of charge across the fleet, state of charge of the fleet, or capacity for the at least one haul truck to complete the at least one task assignment.

17. A system for operating a mine site, comprising:

a fleet of haul trucks that are green-house-gas free and autonomous;

a central controller, including:

at least one memory storing instructions; and at least one processor operatively connected to the at least one memory and configured to execute the instructions to implement:
- a production planner configured to determine at least one task assignment available for the fleet at the mine site and task material weight data for the at least one task; and
- a dispatcher configured to assign the at least one task assignment to at least one haul truck of the fleet, the dispatcher having:
  - a trained reinforcement-learning model that has been trained, based on training first state data that includes state information for the fleet and training second state data that includes state information for the mine site, to learn an assignment policy that optimizes a reward function for the mine site, such that the trained reinforcement-learning model is configured to apply the learned assignment policy to input first state data for the fleet and second state data for the mine site to select at least one task to assign to the fleet, wherein the training first state data includes training haul truck haul weight data and the training second state data includes training task material weight data, such that the learned policy accounts for haul truck performance variance due to changing haul truck haul weight; and
  - an assignment engine configured to perform operations, including:
    - receiving the first state data including haul weight data for at least one haul truck in the fleet;
    - receiving the second state data;
    - assigning the at least one task to the at least one haul truck by inputting the first state data and the second state data into the trained reinforcement-learning model: and
    - causing the at least one haul truck to be operated according to the at least one task assignment.

18. The system of claim 17, further comprising:
at least one production site;
at least one dump site;
at least one static charging station; and
at least one dynamic charging device;
wherein the at least one task assignment includes a route to one or more of the at least one production site, the at least one dump site, the at least one charging station, or the at least one dynamic charging device.

19. The system of claim 17, wherein the at least one task assignment includes route information and speed information.

20. The system of claim 17, wherein the reward function accounts for at least one of total cost for operating the mine site, total material processed by the mine site, power consumption of the mine site, balance of charge across the fleet, state of charge of the fleet, or capacity for the at least one haul truck to complete the at least one task assignment.

* * * * *